US009128914B2

(12) United States Patent
Kobayashi

(10) Patent No.: US 9,128,914 B2
(45) Date of Patent: Sep. 8, 2015

(54) SEMICONDUCTOR INTEGRATED CIRCUIT

(75) Inventor: Yoshiki Kobayashi, Kanagawa (JP)

(73) Assignee: LAPIS Semiconductor Co., Ltd., Yokohama (JP)

( * ) Notice: Subject to any disclaimer, the term of this patent is extended or adjusted under 35 U.S.C. 154(b) by 0 days.

(21) Appl. No.: 13/602,153

(22) Filed: Sep. 1, 2012

(65) Prior Publication Data

US 2013/0058207 A1   Mar. 7, 2013

(30) Foreign Application Priority Data

Sep. 1, 2011   (JP) .................................. 2011-190716

(51) Int. Cl.
*G01R 31/08* (2006.01)
*G06F 11/22* (2006.01)

(52) U.S. Cl.
CPC ................... *G06F 11/221* (2013.01)

(58) Field of Classification Search
CPC .................................................... G06F 11/221
USPC .......................................................... 370/216
See application file for complete search history.

(56) References Cited

U.S. PATENT DOCUMENTS

| 3,986,169 | A | * | 10/1976 | Kobayashi et al. ................. 726/4 |
| 5,784,630 | A | * | 7/1998 | Saito et al. ....................... 712/30 |
| 6,038,182 | A | | 3/2000 | Hwang |
| 7,647,485 | B2 | * | 1/2010 | Kami et al. ................... 712/227 |
| 7,653,849 | B1 | * | 1/2010 | Tabatabaei .................... 714/726 |
| 8,525,548 | B2 | * | 9/2013 | Hutchings et al. .............. 326/38 |
| 2006/0143428 | A1 | * | 6/2006 | Noda et al. ..................... 712/10 |

| 2007/0101198 | A1 | * | 5/2007 | Ueno ............................. 714/38 |
| 2007/0180192 | A1 | * | 8/2007 | Matsuda ....................... 711/118 |
| 2009/0064308 | A1 | * | 3/2009 | Komatsu ......................... 726/12 |
| 2009/0070525 | A1 | * | 3/2009 | Dosaka et al. ................. 711/108 |
| 2009/0183252 | A1 | * | 7/2009 | Nomi .............................. 726/13 |
| 2009/0310649 | A1 | * | 12/2009 | Fisher et al. .................. 375/141 |
| 2010/0054268 | A1 | * | 3/2010 | Divivier ....................... 370/412 |
| 2010/0070802 | A1 | | 3/2010 | Inoue et al. |

(Continued)

FOREIGN PATENT DOCUMENTS

| JP | 2002-215602 A | 8/2002 |
| JP | 2008-225694 A | 9/2008 |

(Continued)

OTHER PUBLICATIONS

An Office Action; "Notice of Rejection," issued by the Japanese Patent Office on Jun. 2, 2015, which corresponds to Japanese Patent Application No. 2011-190716 and is related to U.S. Appl. No. 13/602,153; with English language translation.

*Primary Examiner* — Asad Nawaz
*Assistant Examiner* — Syed S Ali
(74) *Attorney, Agent, or Firm* — Studebaker & Brackett PC

(57) ABSTRACT

Disclosed is a semiconductor integrated circuit capable of efficiently performing debugging. The semiconductor integrated circuit includes a distributing part distributing received packets according to destinations of the packets, a plurality of accumulating parts sequentially accumulating the packets distributed thereto, respectively, a plurality of relaying parts supplying the packets accumulated in one of the accumulating parts to corresponding one of the processing parts, respectively, and an output controlling part assigning the relay permission command to one relaying part designated by a relay permission packet from among the relaying parts when a packet distributed thereto from the distributing part is determined as the relay permission packet.

6 Claims, 5 Drawing Sheets

(56) References Cited

U.S. PATENT DOCUMENTS

2010/0083235 A1* 4/2010 Hozoji et al. ................ 717/127
2010/0157830 A1* 6/2010 Yazaki et al. ................ 370/252
2011/0029830 A1* 2/2011 Miller et al. ................ 714/734

FOREIGN PATENT DOCUMENTS

| JP | 2011-009994 A | 1/2011 |
| JP | H11-238399 A | 8/2011 |
| WO | 2008/126471 A1 | 10/2008 |

* cited by examiner

SEMICONDUCTOR INTEGRATED CIRCUIT

BACKGROUND OF THE INVENTION

1. Technical Field

The present invention relates to a semiconductor integrated circuit. In more particular, the present invention relates to a semiconductor integrated circuit having an auxiliary function for the observation of a communication packet that is performed to correct failure or defect.

2. Background Art

To debug failure or defect occurring in a semiconductor integrated circuit, there has been proposed a method of observing data communicated between the semiconductor integrated circuit and an external device such as a central processing unit (CPU) (for example, Patent Literature 1). Recently, for example, communication by split transaction has become used according to a standard such as Peripheral Component Interconnect Express (hereinafter referred to as 'PCIe'). In the case of such communication, since a next request is achieved before a response to one request is achieved, it is difficult to know the request and the response although the communication packet is observed, so there is a problem in that debugging cannot be efficiently performed. For example, Patent Literature 2 discloses a technology to solve such a problem.

Patent Literature

PTL1: Japanese Patent Kokai No. 2008-225694
PTL2: Japanese Patent Kokai No. 2011-9994

SUMMARY OF INVENTION

The present invention has been made in view of the above problem, and an object of the present invention is to provide a semiconductor integrated circuit capable of efficiently performing debugging.

A semiconductor integrated circuit according to the present invention includes processing parts which process data according to contents of a transmitted packet and a transferring part which transfers arrived packets to one of the processing parts according to destinations of the arrived packets, wherein the transferring part includes receiving parts sequentially receiving the arrived packets, a distributing part distributing the packets received in the receiving part according to destinations of the packets, a plurality of accumulating parts sequentially accumulating the packets distributed thereto from the distributing part, respectively, a plurality of relaying parts supplying the packets accumulated in one of the accumulating parts to corresponding one of the processing parts, respectively, according to a relay permission command, and an output controlling part assigning the relay permission command to one relaying part designated by a relay permission packet from among the relaying parts when a packet distributed thereto from the distributing part is determined as the relay permission packet.

A semiconductor integrated circuit according to the present invention includes processing parts which process data according to contents of a transmitted packet, and a transferring part which transfers arrived packets to one of the processing parts according to destinations of the arrived packets, wherein the transferring part includes receiving parts sequentially receiving the arrived packets, an output controlling part acquiring a relay permission packet as a packet received in the receiving part is determined as the relay permission packet, a distributing part distributing packets received in the receiving part except for transferring packets acquired by the output controlling part according to destinations of the packets, a plurality of accumulating parts sequentially accumulating the packets distributed thereto from the distributing part, respectively, and a plurality of relaying parts supplying the packets accumulated in one of the accumulating parts to corresponding one of the processing parts, respectively, according to a relay permission command, and wherein the output controlling part assigns the relay permission command to one relaying part designated by the relay permission packet from among the relaying parts.

The semiconductor integrated circuit according to the present invention can effectively perform the debug.

DETAILED DESCRIPTION OF INVENTION

Hereinafter, the embodiment of the present invention will be described in detail with reference to accompanying drawings.

First Embodiment

Figure 1:
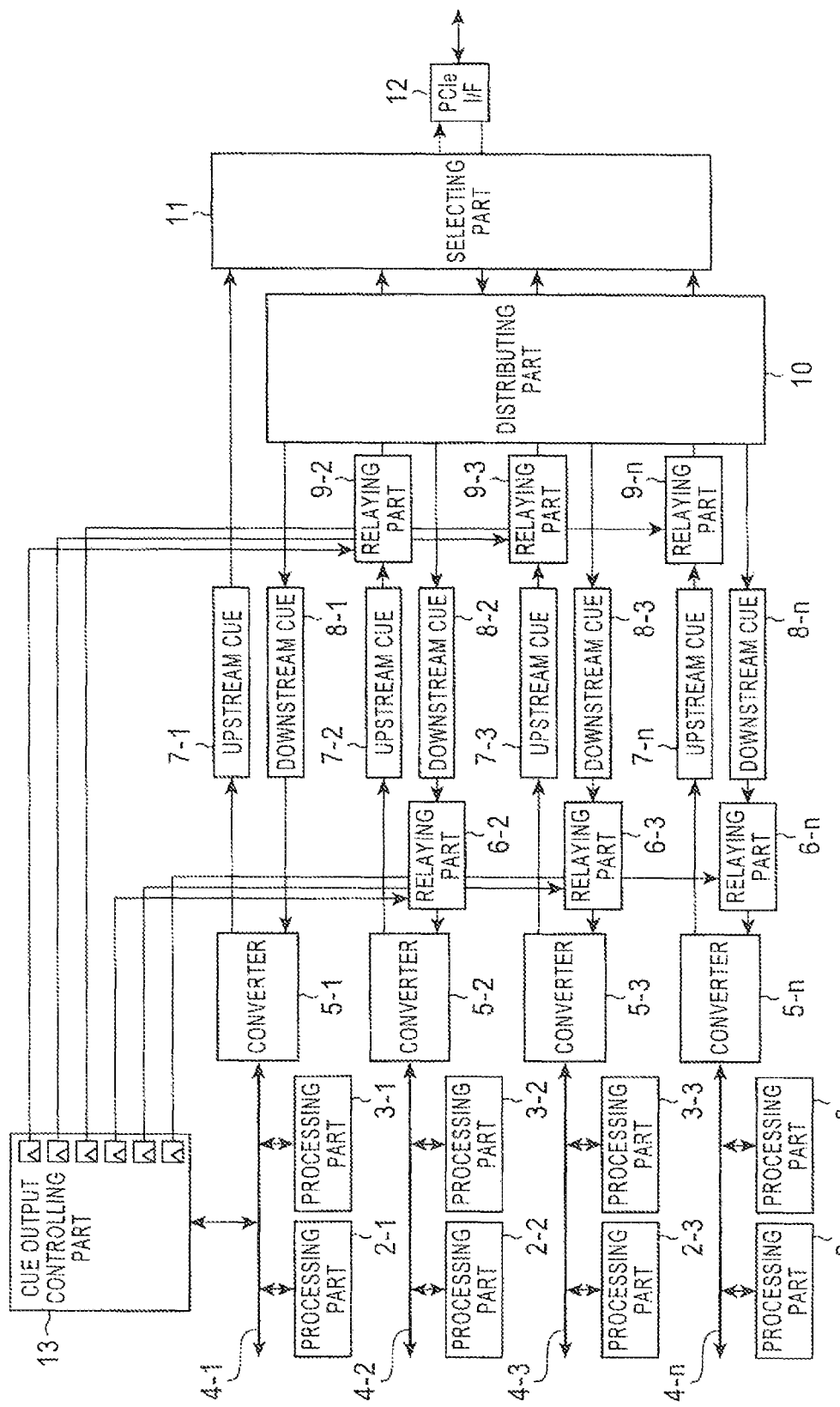
FIG. 1 is a block diagram showing a configuration of a semiconductor integrated circuit according to a first embodiment of the present invention.

FIG. 1 is a block diagram showing a configuration of a semiconductor integrated circuit 1 according to a first embodiment of the present invention.

Figure 2:
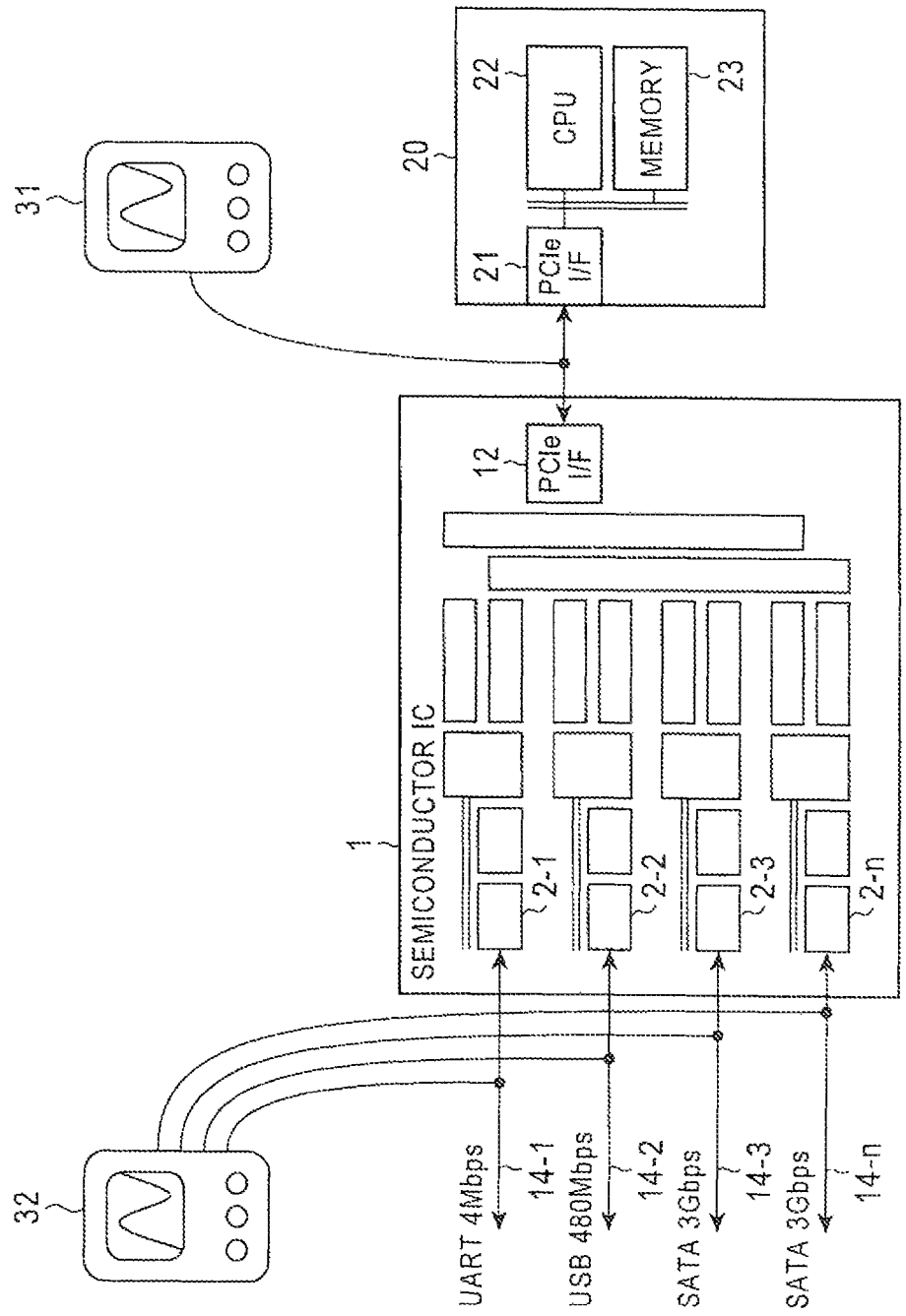
FIG. 2 is a block diagram showing an external device and observing devices together with the semiconductor integrated circuit of FIG. 1.

Each of processing parts 2-1~2-n and 3-1~3-n (n is an integer equal to or greater than 2) processes various data according to contents of transmitted packets. Each processing part may execute data access processing to a memory 23 according to instruction from, for example, an external device 20 (FIG. 2). The processing parts 2-1 and 3-1 transceive the packets through a bus 4-1. The processing parts 2-2~2-n and 3-2~3n transceive the packets through corresponding buses 4-2~4-n, respectively.

The buses 4-2~4-n are bus accessible parallel buses based on the bus standard such as an Advanced Microcontrolling part Bus Architecture Advanced High-performance Bus (AMBA AHB), or a Peripheral Component Interconnect (PCI) bus. Processor inputs/outputs 14-1~14-n are data communication paths through which the data are communicated according to a communication protocol such as a Universal Asynchronous Receiver Transmitter (UART), a Universal Serial Bus (USB), or a Serial Advanced Technology Attachment (SATA).

A converter 5-1 receives the bus accesses output from the processing parts 2-1 and 3-1 through a bus 4-1. In addition, the converter 5-1 converts the received bus accesses into a cue accumulation data format, namely, packets, and sequentially provides the packets to an upstream cue 7-1. Further, the converter 5-1 fetches the packets accumulated in a downstream cue 8-1 in an order of time series, converts the fetched packets into bus accesses, and provides the converted bus accesses to the processing part 2-1 or 3-1 through a bus 4-1.

A converter 5-2 receives bus accesses output from the processing parts 2-2 and 3-2 through a bus 4-2. In addition, the converter 5-2 converts the received bus accesses into the cue accumulation data format, namely, packets, and sequentially provides the packets to an upstream cue 7-2. Further, the converter 5-2 converts a packet relayed from a relaying part 6-2 into a bus access and provides the bus access to the processing part 2-1 or 3-1 through the bus 4-2. Each of converters 5-3-5-n performs the same operation as the operation of the converter 5-2.

Whenever a relaying part 6-2 receives a relay permission command from a cue output controlling part 13, the relaying part 6-2 fetches one of the packets accumulated in the downstream cue 8-2 in an order of time series and relays the fetched packet to the converter 5-2. The relay permission command is to permit the relay of one of the packets accumulated in the downstream cue 8-2, which is given by a relay permission instruction packet, for example, from an external device 20 (FIG. 2). In addition, when receiving a relay stop command from the cue output controlling part 13, the relaying part 6-2 stops the relay of the packets accumulated in the downstream cue 8-2. Each of the relaying parts 6-3~6-n performs the same operation as the operation of the relaying part 6-2.

An upstream cue 7-1 sequentially accumulates the packets provided from the converter 5-1. Each of upstream cues 7-2-7-n performs the same operation as the operation of the upstream cue 7-1.

The downstream cue 8-1 sequentially accumulates the packets provided from a distributing part 10. Each of the downstream cues 8-2~8-n performs the same operation as the operation of the downstream cue 8-1.

Whenever a relaying part 9-2 receives a relay permission command from a cue output controlling part 13, the relaying part 9-2 fetches one of the packets accumulated in the upstream cue 7-2 in an order of time series and relays the fetched packet to the distributing part 10. When receiving a relay stop command from the cue output controlling part 13, the relaying part 9-2 stops the relay of the packets accumulated in the upstream cue 7-2. Each of the relaying parts 9-3~9-n performs the same operation as the operation of the relaying part 9-2.

The distributing part 10 provides packets received by a PCIe_IF 12 to one of the downstream cues 8-1~8-n according to destinations of the packets.

The selector 11 fetches the packet accumulated in one selected from the upstream cue 7-1 and the relaying parts 9-2~9-n and provides the fetched packet to the PCIe_IF 12.

The PCIe_IF 12 is an interface for transceiving the packets through a PCI_Express communication path. The PCIe_IF 12 may transmit the packets provided from the selector 11 to the external device 20 (FIG. 2). The PCIe_IF 12 may supply the packets provided from the external device 20 to the selector 11.

When determining that a packet provided from the bus 4-1 is a relay stop instruction packet or a relay permission instruction packet (hereinafter, generally referred to as 'cue control instruction packet'), the cue output controlling part 13 controls the relaying parts 6-2~6-n and the relaying parts 9-2~9-n according to contents of the packet. The cue output controlling part 13 may generate a relay stop command and a relay permission command of the packet to the relaying parts 6-2~6-n and the relaying parts 9-2~9-n.

Hereinafter, a configuration including the PCIe_IF 12, the distributing part 10, downstream cues 8-1~8-n, the relaying parts 6-1~6-n, and the cue output controlling part 13 will be referred to as a transferring part.

FIG. 2 shows the semiconductor integrated circuit 1 as well as an external device 20 and observing devices 31 and 32 for debugging the semiconductor integrated circuit 1.

The external device 20 provides data and a command for debug to the semiconductor integrated circuit 1.

The PCIe_IF 21 is an interface for transceiving a packet to and from PCIe_IF 12 of the semiconductor integrated circuit 1 according to a PCI_Express protocol.

A CPU 22 controls entire parts of the external device 20, and for example, may provide a command for debug to the semiconductor integrated circuit 1.

A memory 23 stores data for debug.

A packet analyzer 31 is provided between the semiconductor integrated circuit 1 and the external device 20 and may observe transceiver packets according to a PCI_Express protocol. The packet analyzer 32 may observe packets input from the processing parts 2-1~2-n and 3-1~3-n.

Figure 3:
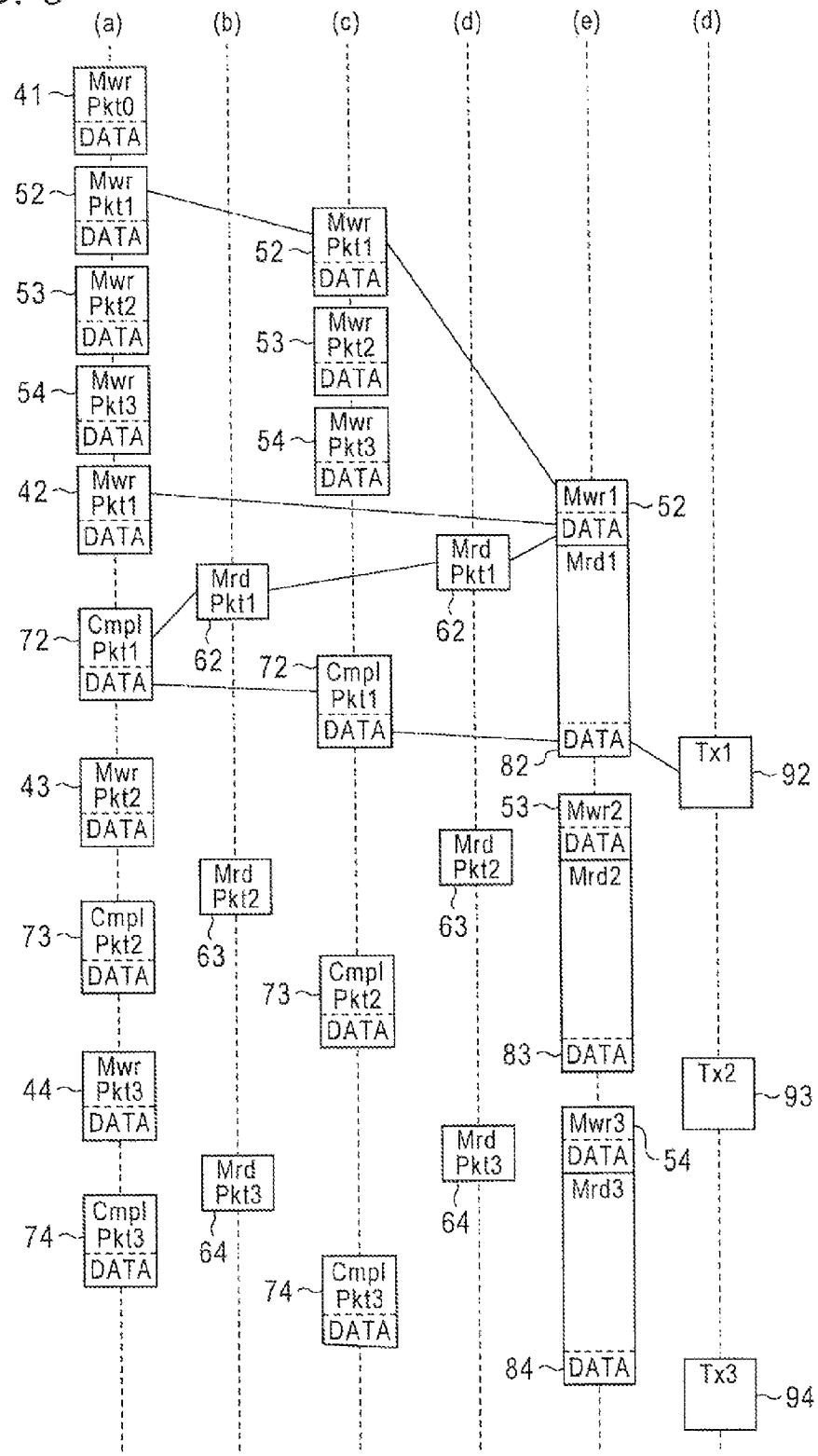
FIG. 3 is a timing chart showing a flow of packets in the semiconductor integrated circuit.

Hereinafter, an operation of the semiconductor integrated circuit 1 during debugging will be described with reference to FIG. 3. FIG. 3 shows packets in time series for each sequence of (a) PCIe_I/F downstream, (b) PCIe_I/F upstream, (c) downstream cue, (d) upstream cue, (e) bus, (f) processing part input/output. A stream of packets directed from the external device 20 to the semiconductor integrated circuit 1 refers to a downstream, and a stream of packets directed from the semiconductor integrated circuit 1 to the external device 20 refers to an upstream. Hereinafter, the operation of the semiconductor integrated circuit 1 when the semiconductor integrated circuit 1 transmits data acquired through a PCIe communication path according to a command from the external device 20 will be described.

First, a relay stop instruction packet 41, operation command packets 52, 53, and 54, and a relay permission command packet 42 are sequentially transmitted to the semiconductor integrated circuit 1 from the CPU 22 of the external device 20. These packets are sequentially received by the PCIe_IF 12 of the semiconductor integrated circuit 1.

The relay stop instruction packet 41 instructs the relay stop of packets accumulated in each of the downstream cues 8-2~8-n, and uses the cue output controlling part 13 as a destination. The cue output controlling part 13 receives the relay stop instruction packet 41 provided to a bus 4-1 via the downstream cue 8-1 and the converter 5-1.

A cue control packet 41 stops the packet relay from the downstream cue 8-2 to the converter 52 by the relaying part 6-2. In the same manner, the cue control packet 41 stops the relay of the packet to converters 5-3~5-n by relaying parts 6-3~6-n. Further, the cue control packet 41 generates a relay permission command to each of the relaying parts 9-2~9-n to allow packet relay. The relaying parts 9-2~9-n sequentially relay packets accumulated in upstream cues 7-2~7-n to the distributing part 10, respectively.

The processing part 2-2 is designated as a destination of the operation command packet 52, the processing part 2-3 is designated as a destination of the operation command packet 53, and the processing part 2-4 is designated as a destination of the operation command packet 54. The operation command packet 52 is supplied from the distributing part 10 to the downstream cue 8-2 and accumulated in the downstream cue 8-2. In the same manner, the operation command packet 53 is accumulated in the downstream cue 8-3, and the operation command packet 54 is accumulated in the downstream cue 8-4. These packets instruct direct memory access (DMA) to a memory 23 to, for example, processing parts thereof, respectively.

The relay permission instruction packet 42 allows the relay of, for example, one of the packets accumulated in the downstream cue 8-2, and designates the cue output controlling part 13 as a destination of the relay permission instruction packet 42. The relay permission instruction packet 42 includes a header, in which destination information of the relay permission instruction packet 42 and packet identification information identifying the relay permission instruction packet are included, and a payload in which a cue identification number of a relay permission target is included.

The cue output controlling part 13 determines whether a packet distributed from the distributing part 10 and provided to the bus 4-1 via the downstream cue 8-1 and the converter 5-1 is the relay permission instruction packet 42 based on the packet identification information.

When it is determined that the packet is the relay permission instruction packet 42, the cue output controlling part 13 relays one of the packets accumulated in the downstream cue 8-2 designated by a cue identification number included in the relay permission instruction packet 42 to the converter 5-2. In this case, the relaying part 6-2 fetches one of the packets from the downstream cue 8-2 in an order of time series and relays the fetched packet to the converter 5-2. The operation command packet 52 is relayed to the converter 5-2. The converter 5-2 provides the operation command packet 52 to the processing part 2-2 through a bus 4-2.

The processing part 2-2 generates a read access packet 62 for the memory 23 according to the operation command packet 52. Readout data 82 from the memory 23 are transmitted together with a readout completion notification 72. The processing part 2-2 receives the readout data 82 through the bus 4-2, and transmits the received readout data 82 from the processing part input/output 14-2 (FIG. 2) to the outside as communication data 92 according to a communication protocol such as UART. Further, the processing part 2-2 may generate a transmission completion notification of the communication data 92 to the CPU 22.

Next, the relay permission instruction packet 43 from the CPU 22 is transmitted to the semiconductor integrated circuit 1. When receiving a transmission completion notification generated by, for example, the processing part 2-2, the CPU 22 generates a relay permission instruction packet 43. In addition, for example, when receiving a transmission completion notification from a monitoring device (not shown) for monitoring the output of communication data 92, the CPU 22 may generate a relay permission instruction packet 43. The relay permission instruction packet 43 is received by a PCIe_IF 12 of the semiconductor integrated circuit 1.

The relay permission instruction packet 43 allows the relay of, for example, one of packets accumulated in the downstream cue 8-3, and designates the cue output controlling part 13 as a destination. The relay permission instruction packet 43 includes destination information, packet identification information, and cue identification information. The cue output controlling part 13 receives the relay permission instruction packet 43 provided from the distributing part 10 to the bus 4-1 through the downstream cue 8-1 and the converter 5-1.

The cue output controlling part 13 relays one of packets accumulated in the downstream cue 8-3 to the converter 5-3 according to cue designation by the relay permission instruction packet 43. In this case, an operation command packet 53 is fetched from the downstream cue 8-3 and the fetched operation command packet 53 is relayed to the converter 5-3 by the relaying part 6-3. The converter 5-3 provides the operation command packet 53 to the processing part 2-3 through the bus 4-3.

The processing part 2-3 generates a read access packet 63 to a memory 23 according to the operation command packet 53. Readout data 83 from the memory 23 are transmitted together with a readout completion notification 73. The processing part 2-3 receives the readout data 83 through the bus 4-3 and transmits the received readout data 83 from the processing part input/output 14-3 (FIG. 2) to the outside as communication data 93 according to a communication protocol such as USB. In addition, the processing part 2-3 may generate a transmission completion notification of the communication data 93 to a CPU 22.

Subsequently, a cue control packet 44 from the CPU 22 is transmitted to the semiconductor integrated circuit 1. For example, when receiving a transmission completion notification generated by the processing part 2-3 or a monitoring device (not shown), the CPU 22 generates a cue control packet 44. The cue control packet 44 is received by a PCIe_IF 12 of the semiconductor integrated circuit.

The cue control packet 44 is a relay permission instruction packet which allows the relay of, for example, one of packets accumulated in a downstream cue 8-3, and designates the cue output controlling part 13 as a destination. The relay permission instruction packet 44 includes destination information, packet identification information, and cue identification information. The cue output controlling part 13 receives the relay permission instruction packet 44 provided from a distributing part 10 to the bus 4-1 through the downstream cue 8-1 and the converter 5-1.

The cue output controlling part 14 relays one of packets accumulated in the downstream cue 8-4 to the converter 5-4 according to cue designation by the relay permission instruction packet 44. In this case, an operation command packet 54 is fetched from the downstream cue 8-4 and the fetched operation command packet 54 is relayed to the converter 5-4 by the relaying part 6-4. The converter 5-4 provides the operation command packet 54 to the processing part 2-4 through the bus 4-4.

The processing part 2-4 generates a read access packet 64 to a memory 24 according to the operation command packet 54. Readout data 84 from the memory 23 are transmitted together with a readout completion notification 74. The processing part 2-4 receives the readout data 84 through the bus 4-3 and transmits the received readout data 84 from the processing part input/output 14-4 (FIG. 2) to the outside as communication data 94 according to a communication protocol such as SATA.

In order to perform the debug when transmitting data by the semiconductor integrated circuit 1, the packet analyzer 31 uses relay permission instruction packets 42~44 indicated in (a) of FIG. 3, namely, in a PCIe_IF downstream sequence as an observing target. Further, the packet analyzer 32, for example, uses communication data 92~94 indicated by the processing part input/output sequence in (f) of FIG. 3 as an observing target. When the communication data 92~94 are used as the observing target, a relay permission instruction packet 42, communication data 92, a relay permission instruction packet 43, communication data 93, a relay permission instruction packet 44, and communication data 94 are sequentially observed in an order of time series.

Figure 4:
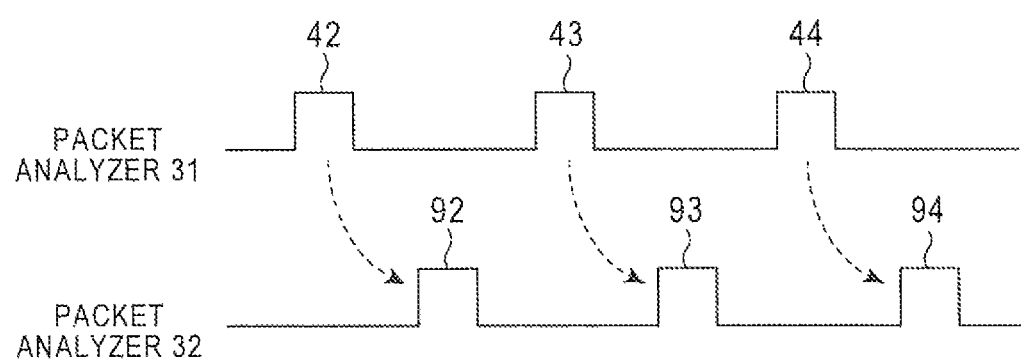
FIG. 4 is a timing chart showing an example of a packet and data observed by each packet analyzer in an order of time series.

The packets and the data observed by the packet analyzers 31 and 32 are illustrated in an order of time series in FIG. 4. Just after the packet analyzer 31 observes the relay permission instruction packet 42, communication data 92 corresponding to the operation command packet 52 supplied to the processing part 2-2 may be observed by the packet analyzer 32. Accordingly, a relationship between the operation command instruction packet 52 and communication data 92 corresponding to the operation command instruction packet 52 may be easily recognized. In the same manner, a relationship between the operation command packet 53 and communication data 93 corresponding to the operation command packet 53 and a relationship between the operation command packet 54 and communication data 94 corresponding to the operation command packet 54 may be readily recognized.

As described above, the semiconductor integrated circuit 1 controls supply timing of an operation command packet to each processing part according to an externally supplied relay stop instruction packet and relay permission instruction packet. In detail, although simultaneously receiving a plurality of operation command packets, the semiconductor integrated circuit 1 does not supply the operation command packets before receiving a relay permission instruction packet. After receiving one relay permission instruction packet, the semiconductor integrated circuit 1 supplies one operation command packet corresponding to the relay permission instruction packet to a processing part. The processing part having received one operation command packet outputs one communication data obtained by data processing according to a command of the packet. After receiving the one relay permission instruction packet, the semiconductor integrated circuit 1 does not output another communication data before outputting the one communication data. Accordingly, for example, as shown in FIG. 4, because the packet analyzer 32 (FIG. 2) may observe one communication data (e.g., reference numeral 92) just after observing one relay permission instruction packet (e.g., reference numeral 42) by the packet analyzer 31 (FIG. 2), a relationship between one operation command packet and one communication data corresponding to the one operation command packet may be recognized.

Through such an operation, when communication by split transaction is performed according to a communication protocol such as PCIe, a relationship between a request according to an operation command packet and a response packet (communication data of this embodiment) to the request may be easily recognized. In particular, when the semiconductor integrated circuit 1 includes a plurality of buses 4-1~4-n, a significantly greater effect is obtained. The reason is that the communication data output from each of the buses 4-1~4-n are not observed because the communication data are mixed in the packet analyzer 32.

For example, patent document 2 discloses a technology, which uses a sequence number, an address, and character string, numerical value to identify the received packets and represents following problems. It is considered that the sequence number corresponds to a "tag" in a PCIe protocol. Since the tag of the PCIe manages only packets, which are not completely processed, to prevent the duplication of the packets, the tag may be duplicated in the packets that have been completely processed. Therefore, PCIe communication has a problem in that it is difficult to identify the packets using the tag.

Furthermore, since a transmission source and a destination may be identified by addresses, types of a plurality of packets transmitted from the same transmission source cannot be identified. In addition, in order to add the character string, numerical value to a packet, a redundancy data area is required in the packet. However, when a CPU controls a device, there is no redundancy data area in a general packet. Accordingly, such a case has a problem in that packets cannot be identified using the character string, numerical value.

As described above, in the related art, for example, even when packets are observed for debug in a semiconductor integrated circuit communicating with the packets according to a communication protocol such as PCIe, it is difficult to identify the packets. Accordingly, for example, it is difficult to know responses of a request packet from an external device such as a CPU and a response packet from a device in the semiconductor integrated circuit which leads to deterioration in efficiency of debug.

In this regard, according to the semiconductor integrated circuit 1 of the present invention, the supply timing of an operation command packet supplied to each processing part is controlled according to the relay stop instruction packet and the relay permission instruction packet supplied from the outside, so the problems occurring in the related art do not occur.

As described above, in the semiconductor integrated circuit 1 according to the present embodiment, a relationship between an external request and a response to the external request can be easily recognized so that debug may be efficiently performed.

Second Embodiment

Figure 5:
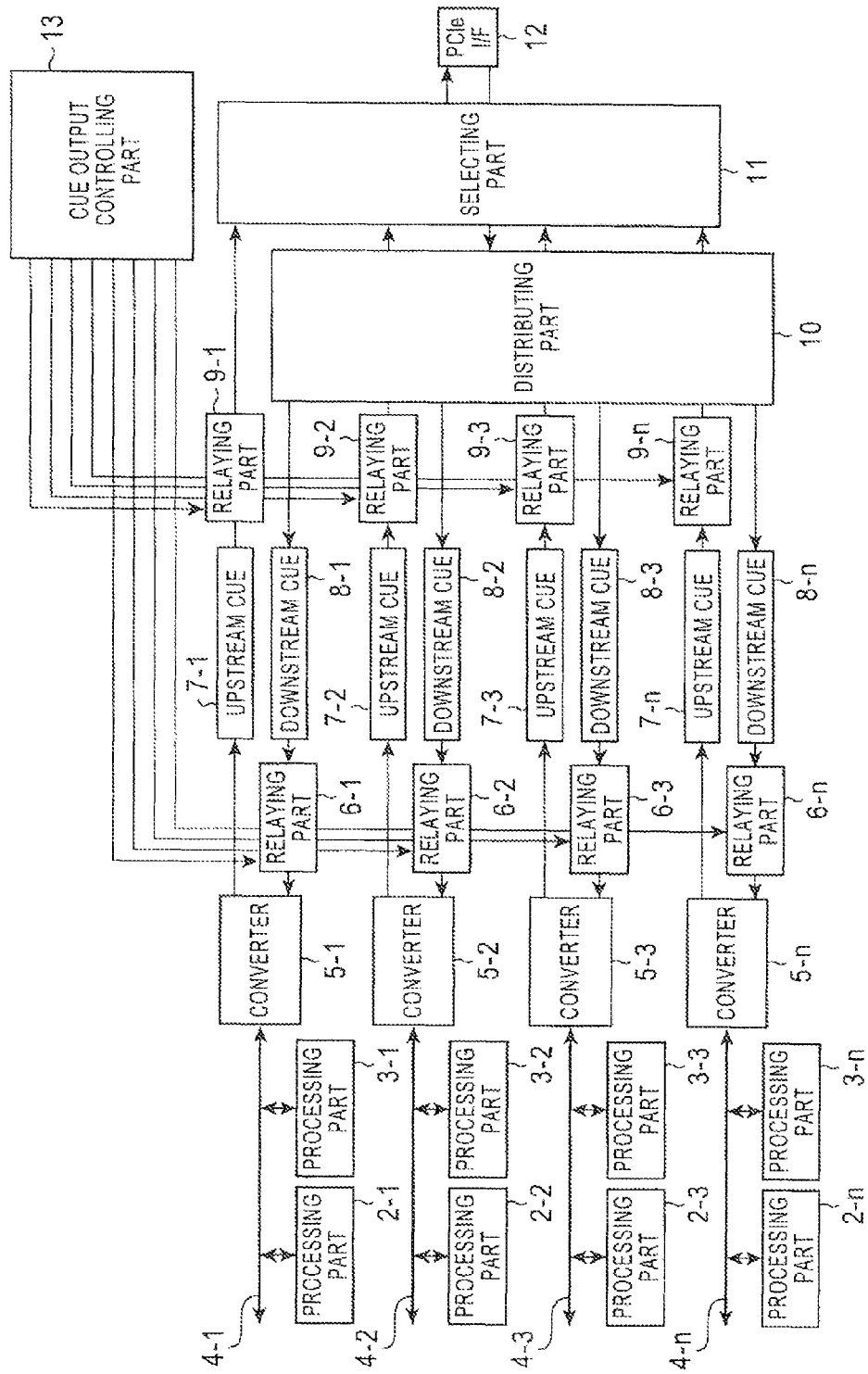
FIG. 5 is a block diagram showing a configuration of a semiconductor integrated circuit according to a second embodiment of the present invention.

FIG. 5 is a block diagram showing a configuration of a semiconductor integrated circuit according to a second embodiment of the present invention. The following description will be focused on the parts different from those of the first embodiment.

A relaying part 6-1 is provided between the converter 5-1 and the downstream cue 8-1. The relaying part 6-1 performs the same operation as that of the relaying part 6-1 according to the first embodiment. Further, a relaying part 9-1 is provided between the upstream cue 7-1 and the selector 11-1. The relaying part 9-1 performs the same operation as that of the relaying part 9-2 according to the first embodiment.

A cue output controlling part 13 acquires a relay stop instruction packet and a relay permission instruction packet received by a PCIe_IF 12. The cue output controlling part 13 determines that the relay stop instruction packet and the relay permission instruction packet employ the cue output controlling part 13 as the destination based on destination information included in the packets. Further, the cue output controlling part 13 determines that the packets are the relay stop instruction packet or the relay permission instruction packet based on packet identification information included in the packets. Further, the cue output controlling part 13 determines a cue of a relay permission target based on a cue identification number included in the relay permission instruction packet and controls the relaying parts 6-1~6-n and 9-1~9-n.

A distributing part 10 supplies packets selected from the packets received by the PCIe_IF 12 to one of downstream cues 8-1~8-n, except for the packets acquired by the cue output controlling part 13, according to a destination of the packets.

Hereinafter, an operation of a semiconductor integrated circuit 1 during debug will be described with reference to FIG. 3.

First, a relay stop instruction packet 41, operation command packets 52, 53, and 54, and a relay permission instruction packet 42 transmitted from a CPU 22 of an external device 20 are sequentially received by the PCIe_IF 12 of the semiconductor integrated circuit 1.

The relay stop instruction packet 41 instructs the relay stop of the packets accumulated in downstream cues 8-1~8-n, and designates the cue output controlling part 13 as a destination. The cue output controlling part 13 directly receives the relay stop instruction packet 41 from the PCIe_IF 12.

The cue control packet 41 stops the packet relay from a downstream cue 8-1 to the converter 5-1 by the relaying part 6-1 according to the relay stop instruction packet 41. In the same manner, the cue control packet 41 stops packet relay to converts 5-2~5-n by relaying parts 6-2~6-n.

The operation command packet 51 is accumulated in the downstream cue 8-2, the operation command packet 53 is accumulated in the downstream cue 8-3, and the operation command packet 54 is accumulated in the downstream cue 8-4.

The relay permission instruction packet 42 permits the relay of, for example, one of the packets accumulated in the downstream cue 8-2, and the cue output controlling part 13 is designated as a destination of the relay permission instruction packet 42. The cue output controlling part 13 directly receives the relay permission instruction packet 42 for the PCIe_IF 12.

The cue output controlling part 13 relays the operation command packet 52 accumulated in the downstream cue 8-2 to the converter 5-2 according to the relay permission instruction packet 42. The converter 5-2 provides the operation command packet 52 to the processing part 2-2 through the bus 4-2.

The processing part 2-2 generates a read access packet 62 to the memory 23 according to the operation command packet 52. The processing part 2-2 receives readout data 82 from the memory 23 together with a readout completion notification 72, and transmits the received readout data 82 from the processing part input/output 14-2 (FIG. 2) to the outside as communication data 92 according to a communication protocol such as UART.

Even when the relay permission instruction packets 43 and 44 are provided from the external device 20, the semiconductor integrate circuit 1 performs the same operation.

As described above, the cue output controlling part 13 in the semiconductor integrated circuit 1 according to the present invention directly receives the relay stop instruction packet and the relay permission instruction packet from the PCIe_IF 12 without using the bus 4-1. Due to such a configuration, the packet relay timing with respect to a path of the bus 4-1 is suitably controlled, so that the debug can be efficiently performed. In addition, since the cue output controlling part 13 directly receives the packets from the PCIe_IF 12, availability of the timing control is improved.

Although the first and second embodiments illustrate that the processing parts 2-2, 2-3, and 2-4 serve as the destinations of the operation command packets 52, 53, and 54, the present invention is not limited thereto. For example, when the operation command packets 52, 53, and 54 use one of processing parts 2-1~2-n as a destination, the same result may be obtained by the same processing.

Although the first and second embodiments have been described with reference to a debug operation, during a normal operation, namely, when the debug is not performed, a cue output controlling part 13 generates a relay permission command with respect to relaying parts 6-1~6-n and 9-1~9-n to allow packet relay.

This application is based on Japanese Patent Application No. 2011-190716 which is herein incorporated by reference.

What is claimed is:

1. A semiconductor integrated interface circuit, comprising:
    a plurality of processing parts which respectively process data appearing on a plurality of bus lines;
    a receiving part for receiving packets;
    a distributing part for distributing the received packets in accordance with destinations contained in the received packets;
    a plurality of accumulating parts for accumulating the packets provided from the distributing part;
    a plurality of relaying parts for converting the packets accumulated in the accumulating parts into data, and relaying the converted data to said processing parts in response to a relay permission command assigned thereto; and
    an output controlling part for supplying the relay permission command to a corresponding one of said relaying parts when the distributed packet is determined as a relay permission packet based on packet identification information contained in the distributed packet from said distributing part;
    wherein said processing parts respectively generate communication data used for debugging, in accordance with the relayed data from the corresponding relaying parts, and output said communication data to a succeeding stage with a debugging function;
  wherein
    the plurality of bus lines includes a first inner bus line and a second inner bus line;
    said distributing part distributes the relay permission packet to the first inner bus line;
    said output controlling part supplies the relay permission command to accumulating parts connected to the second inner bus line; and
    a processing part of the plurality of processing parts receives readout data from a bus line of the plurality of bus lines, and transmits the received readout data to the outside as communication data according to a communication protocol.

2. The semiconductor integrated circuit of claim 1, wherein the processing parts generate a completion notification when the processing of the data for one packet provided from the relaying part is completed.

3. The semiconductor integrated circuit of claim 1, wherein:
    said communication data is observed, and a timing of observation is compared with a reception time of the received data to the relay permission packet, when debugging.

4. A semiconductor integrated interface circuit, comprising:
    a plurality of processing parts which respectively process data appearing on a plurality of bus lines;
    receiving parts for receiving packets;
    an output controlling part for acquiring a relay permission packet when a received packet is determined as the relay permission packet;
    a distributing part for distributing the received packets except for packets acquired by the output controlling part in accordance with destinations of the packets;
    a plurality of accumulating parts accumulating the packets provided from the distributing part; and
    a plurality of relaying parts for converting the packets accumulated in the accumulating parts into data and relaying the converted data to said processing parts in response to a relay permission command assigned thereto;
    wherein the output controlling part supplies the relay permission command to a corresponding one of said relaying parts; and
    wherein said processing parts respectively generate communication data used for debugging, in accordance with the relayed data from the corresponding relaying parts, and output said communication data to a succeeding stage with a debugging function;
  wherein the plurality of bus lines includes a first inner bus line and a second inner bus line;

said distributing part distributes the relay permission packet to the first inner bus line;

said output controlling part supplies the relay permission command to accumulating parts connected to the second inner bus line; and a processing part of the plurality of processing parts receives readout data from a bus line of the plurality of bus lines, and transmits the received readout data to the outside as communication data according to a communication protocol.

5. The semiconductor integrated circuit of claim 4, wherein the processing parts generates a completion notification when the processing of the data for the one packet provided from the relaying part is completed.

6. The semiconductor integrated circuit of claim 4, wherein:

said communication data is observed, and a timing of observation is compared with a reception time of the received data to the relay permission packet, when debugging.

\* \* \* \* \*